United States Patent [19]
Stuckel

[11] Patent Number: 5,524,684
[45] Date of Patent: Jun. 11, 1996

[54] CLAMP AND GUIDE APPARATUS FOR FORMING A MORTISE IN A DOOR OR A DOORJAMB

[75] Inventor: Robert W. Stuckel, Arlington Heights, Ill.

[73] Assignee: R. J. Stuckel Co., Inc., Elk Grove Village, Ill.

[21] Appl. No.: 372,444

[22] Filed: Jan. 13, 1995

[51] Int. Cl.⁶ .................................................... B27C 5/00
[52] U.S. Cl. .................. 144/144.51; 144/27; 144/144.1; 144/144.52
[58] Field of Search ..................... 144/27, 144 R, 144/144.5 R, 144.5 GT, 372; 269/904; 33/197

[56] References Cited

U.S. PATENT DOCUMENTS

| | | | |
|---|---|---|---|
| 3,313,327 | 4/1967 | Goldstein | 144/27 |
| 3,730,236 | 5/1973 | Frydenberg | 144/144 R |
| 4,815,215 | 3/1989 | Saylor et al. | |
| 5,146,961 | 9/1992 | Schoeller | 144/27 |
| 5,154,214 | 10/1992 | Hagerman | 144/144.5 R |

*Primary Examiner*—W. Donald Bray
*Assistant Examiner*—Gene L. Kim
*Attorney, Agent, or Firm*—Speckman, Pauley & Fejer

[57] ABSTRACT

A clamp and guide apparatus for forming a mortise in a door or a doorjamb. A base of the clamp and guide apparatus can be adjustably clamped with respect to either the door or the doorjamb. A support arm is secured with respect to a baseplate of the base. A clamp bracket is adjustably mounted with respect to the support arm, preferably so that it moves along a longitudinal axis of the support arm. The clamp bracket has a grasping leg portion which engages against a relatively small available grasping surface of a doorjamb.

21 Claims, 4 Drawing Sheets

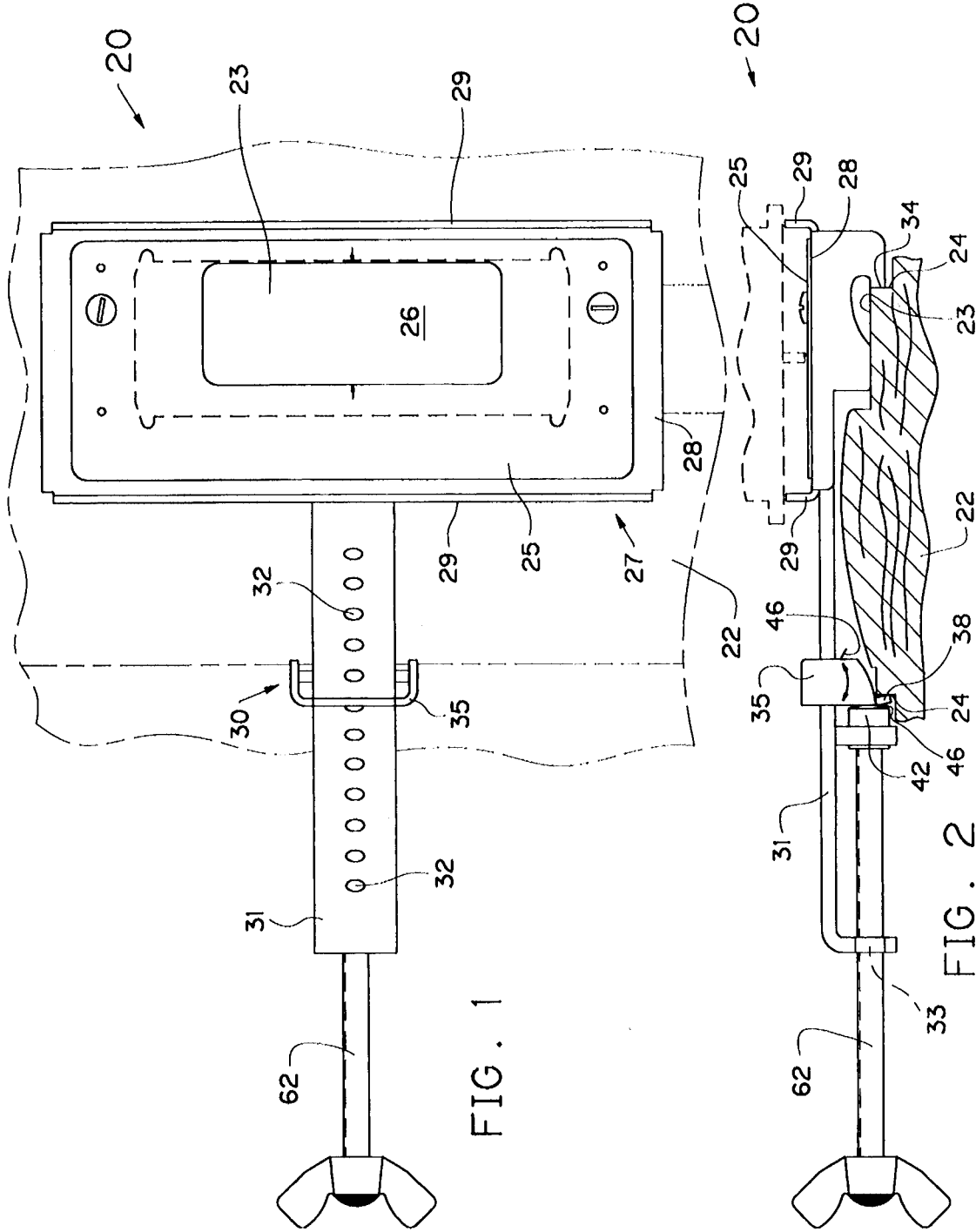

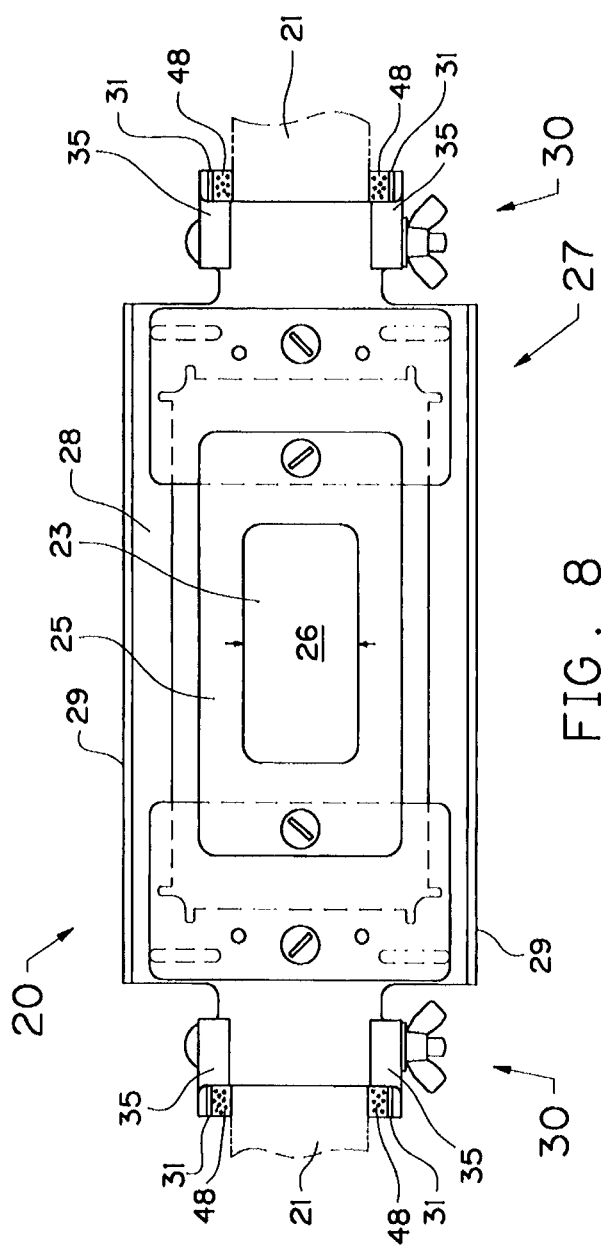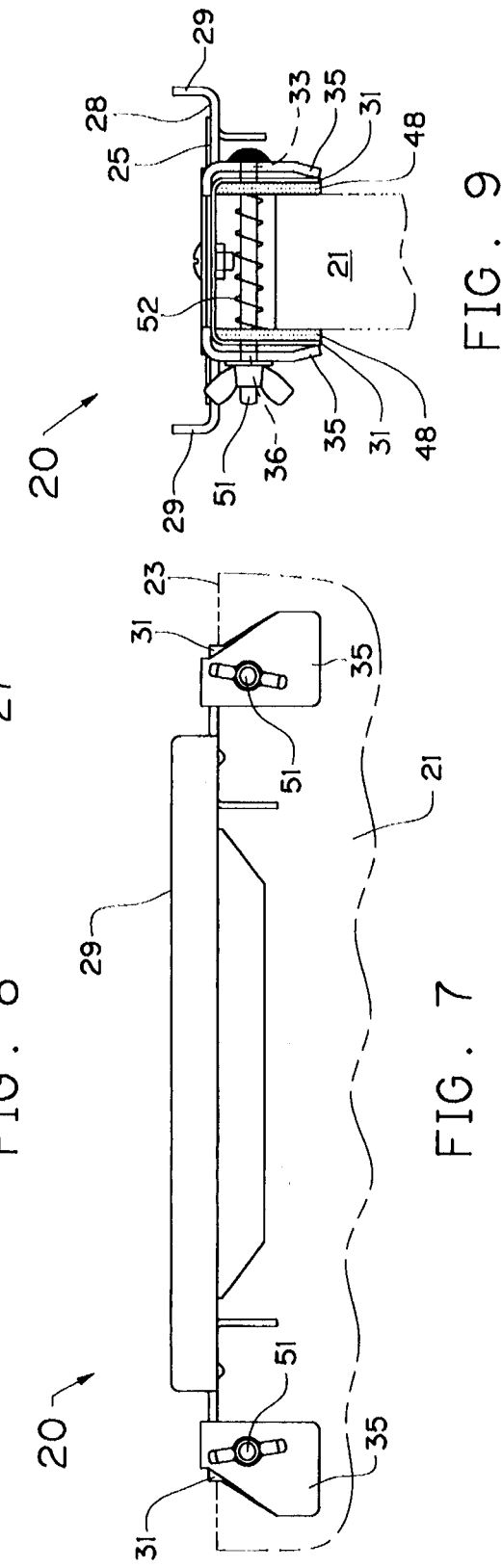

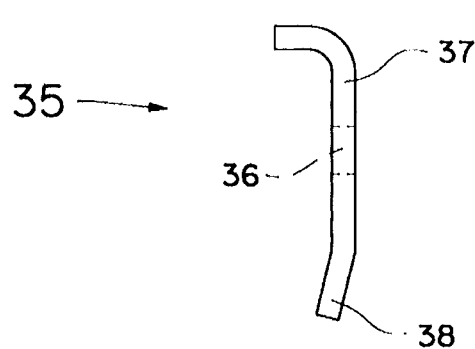 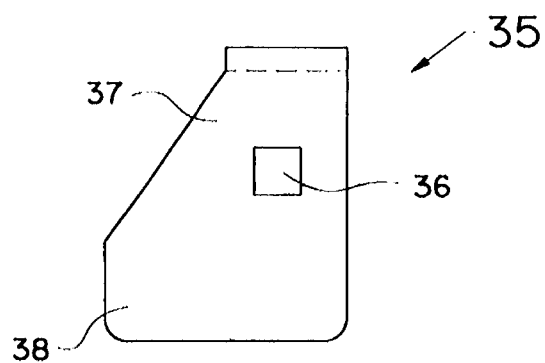
FIG. 11    FIG. 10
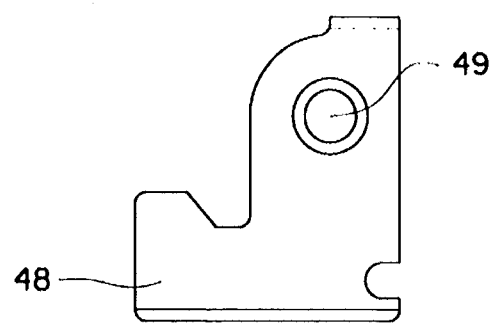 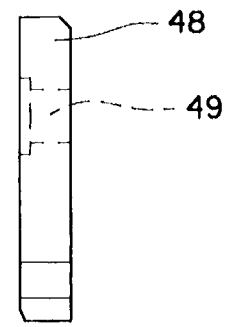
FIG. 12    FIG. 13
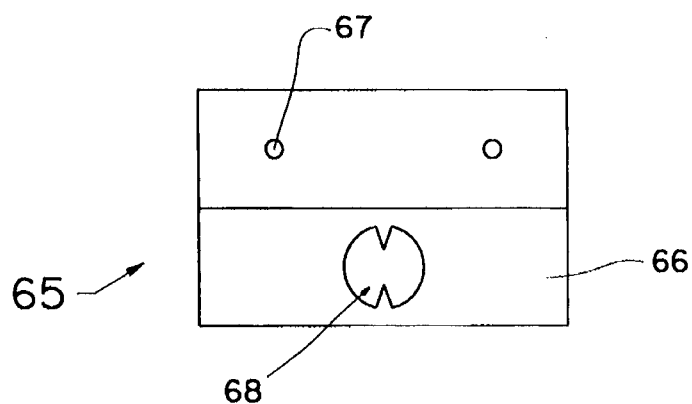 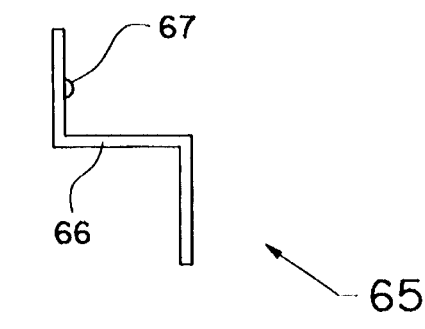
FIG. 14    FIG. 15

CLAMP AND GUIDE APPARATUS FOR FORMING A MORTISE IN A DOOR OR A DOORJAMB

BACKGROUND OF THE INVENTION

1. Field of the Invention

This invention relates to an apparatus that is temporarily fixed in a clamped position on either a door or a doorjamb, for accommodating and supporting a tool, such as a power router, at a fixed distance from a working surface. The apparatus accepts interchangeable templates for guiding the tool about a predetermined pattern.

2. Description of Prior Art

Various hand tools, such as chisels, hammers and the like, have been used to carve mortises within doors and doorjambs. More recently, power routers have been used to quickly and accurately create such mortises.

U.S. Pat. No. 4,815,215 discloses a universal holding fixture with integrated templates which are used for routing recesses within doors and doorjambs. A pair of blocks are affixed to opposite sides of a base which is positioned perpendicular to a working surface. The blocks contact one side of a door. A threaded thumb screw has a ball socket swivel mounted on one end. The threaded thumb screw is used to tighten the swivel against the opposing face of the door. Thus, the door is positioned between the swivel and the blocks. Such mechanical arrangement fixes the position of two legs with respect to the door or doorjamb. An interchangeable template is mounted across the two legs, which are positioned perpendicular with respect to the base. It is apparent that such universal holding fixture cannot effectively grasp a doorjamb that does not have square edges or relatively large grasping surfaces, such as those found on an irregularly shaped doorjamb. Thus, there is an apparent need for an improved clamping apparatus, particularly one that will remain fixed with respect to an irregularly shaped doorjamb that has relatively small grasping surfaces.

SUMMARY OF THE INVENTION

It is therefore one object of this invention to provide a clamp and guide apparatus that can be adjusted and securely fixed with respect to an irregularly shaped door or doorjamb.

It is another object of this invention to provide a clamping apparatus that requires very little surface contact between a grasping leg of the clamping apparatus and a relatively small grasping surface of the doorjamb or the door.

It is another object of this invention to provide a clamp and guide apparatus which interchangeably accepts templates mounted in a position that is approximately parallel to a baseplate of the apparatus.

It is still another object of this invention to provide a clamp and guide apparatus that interchangeably accepts various templates which are mounted with respect to a baseplate.

The above and other objects of this invention are accomplished, according to preferred embodiments of this invention, with a clamp and guide apparatus having a base which can be adjustably clamped with respect to a door or a doorjamb. The clamp and guide apparatus preferably has a baseplate and a support arm secured with respect to the baseplate. A clamp bracket is adjustably mounted with respect to the support arm, preferably so that the clamp bracket can travel along a longitudinal axis of the support arm.

In one preferred embodiment according to this invention, the clamp bracket has a grasping leg portion that can be engaged with a relatively small grasping surface of the doorjamb. In one preferred embodiment according to this invention, the clamp bracket has a cutout hole. In a mounted position, the clamp bracket is positioned within the cutout hole. The support arm preferably has at least one position hole, preferably a plurality of position holes, into which projects a lock tang which extends from the clamp bracket. The cutout hole and the lock tang are preferably designed so that the lock tang can be disengaged from within the position hole and thereby allow the clamp bracket to move along the longitudinal axis of the support arm.

Once the clamp bracket is set with respect to a position hole within the support arm, a clamping screw is used to force the clamp bracket toward the doorjamb and thus tightly engage the grasping leg portion against an available flat surface of the doorjamb. A clamp leg, which preferably extends from the baseplate, contacts an opposing surface of the doorjamb. In one preferred embodiment of this invention, the clamping screw is rotatably mounted within an internally threaded arm through hole of the support arm. By rotating the clamping screw within the arm through hole, the clamping screw can move back and forth in a direction along the longitudinal axis of the support arm.

In one preferred embodiment according to this invention, a contact member is mounted to the free end of the clamping screw. The contact member preferably has an alignment pin which engages with an alignment hole of the clamp bracket. Moving the clamping screw and the contact member against the clamp bracket forces the grasping leg portion of the clamp bracket against the available flat surface of the doorjamb. Once the clamp bracket is set within the position hole of the support arm, the clamp bracket has limited pivotal movement with respect to the support arm, which assists fine tuning for tightening the grasping leg portion of the clamp bracket against the available flat surface of the doorjamb.

In another preferred embodiment according to this invention, the clamp bracket has both a base portion and an adjacent grasping leg portion, wherein a general plane defining the grasping leg portion is angled with respect to a general plane defining the base portion. In such preferred embodiment according to this invention, in a fixed position of the clamp and guide apparatus, the clamp bracket is forced against the support arm to establish general line contact between the grasping leg portion and the support arm, as well as general line contact between the base portion and the support arm. In such preferred embodiment, the clamp bracket forces the support arm toward a grasping surface of the door or the doorjamb. In such preferred embodiment, there are two support arms positioned opposite each other and on opposite sides of the door or the doorjamb. Both support arms can be forced toward each other to provide a clamping result.

Such clamping result can be accomplished with a clamping screw that extends through an arm through hole of the support arm and through a bracket through hole of the clamp bracket. By tightening the clamping screw, the opposing clamping brackets and thus opposing support arms move toward each other.

In the preferred embodiments according to this invention, shoes can be pivotally mounted with respect to an inner side of the support arm. Such shoes can be used to vary the distance between contact surfaces of the shoes or the support arms. Because the shoes provide such variable dimension capabilities, the clamp and guide apparatus according to this invention can be used on differently sized conventional doors.

A locator bracket can be temporarily set with respect to the template for locating a preferred position of the clamp and guide apparatus. In one preferred embodiment according to this invention, the locator bracket has a sight that can be aligned with a reference line or marking on the door or the doorjamb.

BRIEF DESCRIPTION OF THE DRAWINGS

The above-mentioned and other features and objects of this invention will be better understood from the following detailed description taken in conjunction with the drawings, wherein:

FIG. 1 is a front view of a clamp and guide apparatus, according to one preferred embodiment of this invention, which is preferably used in connection with doorjambs;

FIG. 2 is a top view of the clamp and guide apparatus shown in FIG. 1;

FIG. 7 is a side view of a clamp and guide apparatus, according to another preferred embodiment of this invention, which is preferably used in connection with doors;

FIG. 8 is a front view of the clamp and guide apparatus shown in FIG. 7;

FIG. 9 is a top view of the clamp and guide apparatus shown in FIGS. 7 and 8;

FIG. 10 is a side view of a clamp bracket, according to another preferred embodiment of this invention;

FIG. 11 is a top view of the clamp bracket shown in FIG. 10;

FIG. 12 is a side view of a shoe shown in the clamp and guide apparatus of FIGS. 7–9;

FIG. 13 is a top view of the shoe shown in FIG. 12;

FIG. 14 is a front view of a locator bracket, according to one preferred embodiment of this invention; and FIG. 15 is a side view of the locator bracket shown in FIG. 14.

DESCRIPTION OF PREFERRED EMBODIMENTS

Figure 5:
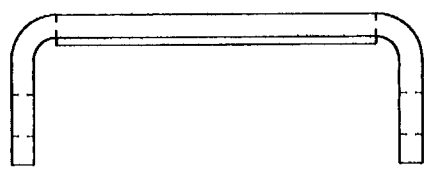
FIG. 5 is a front view of the clamp bracket shown in FIGS. 3 and 4.

Conventional devices have been clamped to a door or a doorjamb for the purpose of providing a template or guide which accommodates a tool, such as a power router. The conventional devices typically support the power tool above a base structure. Such conventional devices have interchangeable templates.

The clamp and guide apparatus according to this invention is particularly useful because of its enhanced grasping capabilities. For example, many conventional devices cannot be effectively tightened to a door or a doorjamb because of inadequate clamping devices, which leads to obvious problems. This invention incorporates a clamp leg and a grasping leg which are adjustable with respect to each other, in one preferred embodiment. Such arrangement according to this invention results in a clamp and guide apparatus that can be effectively tightened to standard or irregularly shaped doors or doorjambs.

FIGS. 1 and 2 show clamp and guide apparatus 20, according to one preferred embodiment of this invention. Such preferred embodiment is typically used when routing a mortise within a doorjamb, for the purpose of installing a strike plate, deadbolt receiving plate or hinge. FIGS. 7–9 show clamp and guide apparatus 20, according to another preferred embodiment of this invention, which is typically connected to a door for routing a mortise that accepts a door lock plate or a hinge. In both preferred embodiments, baseplate 28 has integral rails 29 for accommodating and supporting a power tool, such as a router. Both preferred embodiments of clamp and guide apparatus 20, as shown in such drawings, comprise baseplate 28 with interchangeable templates 25. However, the elements of clamp means 30 somewhat differ between both preferred embodiments.

First referring to the preferred embodiment of clamp and guide apparatus 20 as shown in FIGS. 1 and 2, clamp means 30 are used to adjustably clamp base 27 with respect to doorjamb 22. According to the preferred embodiment shown in FIGS. 1–6, clamp means 30 comprise baseplate 28 and support arm 31 which is secured with respect to baseplate 28. It is apparent that support arm 31 can be welded, bolted or otherwise suitably connected or integrally formed with baseplate 28.

Figure 3:
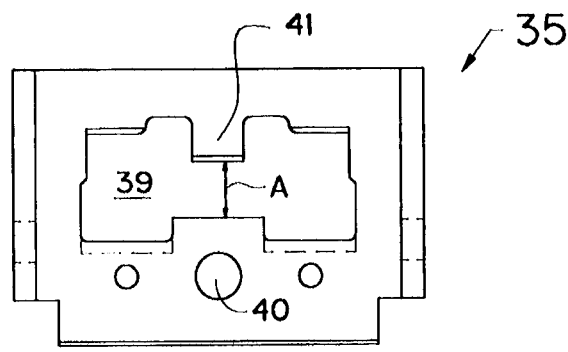
FIG. 3 is a side view of a clamp bracket, according to one preferred embodiment of this invention.
Figure 4:
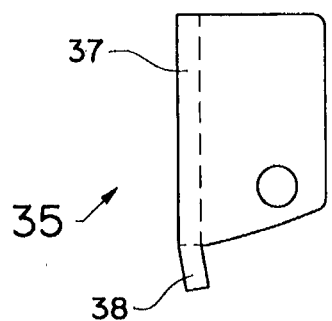
FIG. 4 is a top view of the clamp bracket shown in FIG. 3.

FIGS. 3–5 show clamp means 30 comprising clamp bracket 35, according to one preferred embodiment of this invention. As clearly shown in FIG. 3, clamp bracket 35 has cutout hole 39. In a mounted position of clamp bracket 35, as shown in FIGS. 1 and 2, support arm 31 is positioned within cutout hole 39. Mount means are used to adjustably mount clamp bracket 35 with respect to support arm 31. As most clearly shown in FIG. 1, clamp bracket 35 is capable of moving in a direction along the longitudinal axis of support arm 31. By designing the thickness of support arm 31 less than dimension A, as shown in FIG. 3, it is apparent that clamp bracket 35 can be raised, moved along the longitudinal axis of support arm 31, and then lowered into a position where lock tang 41 fits within position hole 32 of support arm 31. By having a plurality of position holes 32, as shown in FIG. 1, clamp bracket 35 can be adjusted into many positions along the longitudinal axis of support arm 31. The distance between position holes 32 can be designed to provide greater dimensional versatility for adjusting clamp and guide apparatus 20 to accommodate differently sized doorjambs 22.

As shown in FIG. 3, clamp bracket 35 has alignment hole 40. Contact member 42, which is generally shown as a knob in FIGS. 2 and 6, comprises alignment pin 43. As shown in FIG. 2, alignment pin 43 engages within alignment hole 40.

As clearly shown in FIG. 4, and in the preferred embodiment of FIG. 11, clamp bracket 35 further comprises base portion 37 and grasping leg portion 38. A general plane defining grasping leg portion 38 is preferably angled with respect to a general plane defining base portion 37. FIG. 11 shows that grasping leg portion 38 is positioned at angle α with respect to base portion 37. The angled arrangement enables grasping leg portion 38 to act as a claw-type bracket which typically establishes general line contact between an edge of grasping leg portion 38 and the relatively small grasping surface 24, as shown in FIG. 2. Such aspect of this invention is particularly advantageous for attaching clamp and guide apparatus 20 to a doorjamb that offers only such relatively small grasping surface 24.

It is apparent that clamp bracket 35 can be integrally formed from a sheet metal stamping or can be constructed by connecting separate elements. FIGS. 3–5 show clamp bracket 35 as an integrally formed element, which is preferred for increasing the strength of materials and reducing the manufacturing costs.

Lock means are used to fix a position of clamp bracket 35 with respect to support arm 31. Because of the shape of cutout hole 39 and because of lock tang 41, when lock tang 41 is mounted within position hole 32, clamp bracket 35 pivots to a certain degree in the general direction shown in FIG. 2 by the double arrow on clamp bracket 35. The pivoting movement is limited as adjustment means are used to force contact member 42 against clamp bracket 35, as shown in FIG. 2.

In one preferred embodiment according to this invention, bias means are used to urge clamp bracket 35 toward and against contact member 42. The bias means may comprise leaf spring 46 having one end secured with respect to clamp bracket 35. The two through holes shown in FIG. 3, on opposing sides of alignment hole 40, can be used to accommodate threaded screws, rivets or the like for attaching or securing the one end of leaf spring 46 to clamp bracket 35. An opposite end of leaf spring 46 is preferably urged against support arm 31, particularly when clamp and guide apparatus 20 is in a mounted position. The bias means provide a gradually increasing tension adjustment as contact member 42 continues to be forcibly displaced against clamp bracket 35.

The adjustment means used to force contact member 42 against clamp bracket 35, according to one preferred embodiment of this invention, comprise clamping screw 62, which is clearly shown in FIGS. 1 and 2. Clamping screw 62 is rotatably mounted with respect to support arm 31. As shown in FIG. 2, clamping screw 62 has external threads which are engaged within internal threads of arm through hole 33, as shown in FIG. 2. It is apparent that other suitable mechanical arrangements can be used to accomplish the same result of allowing clamping screw 62 or another suitable rod to move along the longitudinal axis of support arm 31.

Figure 6:
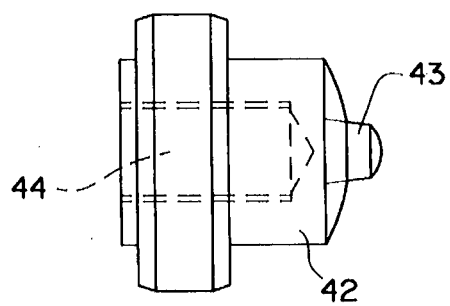
FIG. 6 is a top view of a contact member, according to one preferred embodiment of this invention.

As shown in FIG. 2, contact member 42 is preferably mounted at a free end of clamping screw 62. Internal recess 44, as shown in FIG. 6, is used to attach contact member 42 onto clamping screw 62. However, it is apparent that any other suitable mechanical attachment can be used to accomplish the same result of securing contact member 42 with respect to clamping screw 62.

As clearly shown in FIG. 2, clamp leg 34 is integrally formed with baseplate 28. Clamp leg 34 is used to contact grasping surface 24 of doorjamb 22, for example. It is apparent that clamp leg 34 can also be a separate component secured in any suitable manner with respect to baseplate 28. According to the preferred embodiment of this invention as shown in FIGS. 1 and 2, baseplate 28 integrally forms both clamp legs 34 and rails 29. As clearly shown by the dashed lines in FIG. 2, a power tool, such as a router, can be positioned and supported across the upper rail surfaces of rails 29. It is apparent that rails 29 can also be separate components secured in any suitable manner to baseplate 28. However, the intergrated arrangement increases strength of the structure and reduces the manufacturing costs.

As most clearly shown in FIGS. 2 and 9, when clamp and guide apparatus 20 is in a mounted position baseplate 28 is positioned approximately parallel to working surface 23 of door 21 or doorjamb 22. Clamp and guide apparatus 20 may also comprise locator means 65 for positioning baseplate 28 with respect to either door 21 or doorjamb 22. FIGS. 14 and 15 show one preferred embodiment of locator means 65. Locator bracket 66 is preferably angled, as shown in FIG. 15. Detent tabs 67 are matable within two corresponding holes of baseplate 28 or template 25. Once set with respect to baseplate 28, sight means 68 can be used to align clamp and guide apparatus 20 into an aligned position. In one preferred embodiment according to this invention, as shown in FIG. 14, sight means 68 comprise a cutout section having two opposing and aligned pointed arms which can be used to sight and align the apparatus.

Referring now to the preferred embodiment of clamp and guide apparatus 20 as shown in FIGS. 7–13, baseplate 28 accommodates interchangeable templates 25. As shown in the drawings, template 25 is interchangeably mounted with screws. However, it is apparent that other suitable means for interchanging template 25 can be used in connection with baseplate 28.

As shown in FIGS. 7–9, the mount means of such preferred embodiment comprise clamp bracket 35 having base portion 37 and grasping leg portion 38, which is at α angle with respect to base portion 37, as shown in FIG. 11. From FIG. 9, it is apparent that such angular relationship enables clamp bracket 35 to force opposing support arms 31 toward each other and thereby clamp shoes 48 against door 21. Tightening clamping screw 51 applies the necessary forces to clamp bracket 35 for effectively tightening shoes 48 against door 21. With such angular arrangement, tightening clamping screw 51 establishes forced contact between grasping leg portion 38 and support arm 31, as well as between base portion 37 and support arm 31, as clearly shown in FIG. 9.

Clamping screw 51 preferably extends through bracket through hole 36 and arm through hole 33, as best shown in FIG. 9. However, it is apparent that other suitable mechanical devices can be used to force together opposing clamp brackets 35.

As clearly shown in FIGS. 8 and 9, shoes 48 are each positioned between support arm 31 and door 21. Various thicknesses of shoes 48 can be substituted to accommodate various door thicknesses. Each shoe 48 is preferably pivotally mounted with respect to support arm 31, so that shoe 31 can pivot out of the way to accommodate a thicker door 21, such as a door 21 that fits closely between support arms 31. Clamping screw 51 positioned within shoe through hole 49, which is clearly shown in FIG. 12, creates the pivoting relationship between shoe 48 and support arm 31, according to one preferred embodiment according to this invention.

Bias means are used to urge shoe 48 against an inner side of support arm 31, as clearly shown in FIG. 9. In one preferred embodiment according to this invention, the bias means comprise spring 52, which is preferably a coiled compression spring, mounted about clamping screw 51. Spring 52 is preferably biased against shoe 48 so that it forces shoe 48 into an adjacent position with respect to support arm 31. Shoe 48 can be locked into either an active position for contacting door 22, as shown in FIG. 9, or into an inactive position for avoiding contact with door 22.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a clamp and guide apparatus for forming a mortise in one of a door and a doorjamb, the clamp and guide apparatus having a base fixed with respect to the doorjamb, support means for supporting a tool above the base, and interchangeable means for interchangeably fixing a template with respect to the base, the improvement comprising:

clamp means for adjustably clamping the base with respect to the one of the door and the doorjamb, said clamp means comprising the base having a baseplate, a support arm secured with respect to said baseplate, a clamp bracket, mount means for adjustably mounting said clamp bracket with respect to said support arm, said clamp bracket having a grasping leg portion, lock means for fixing a position of said clamp bracket with respect to said support arm, a contact member, and adjustment means for forcing said contact member against said clamp bracket.

2. In a clamp and guide apparatus according to claim 1 further comprising at least one clamp leg extending from said baseplate.

3. In a clamp and guide apparatus according to claim 2 wherein said at least one clamp leg is integrally formed with said baseplate.

4. In a clamp and guide apparatus according to claim 1 wherein in a mounted position of the clamp and guide apparatus on the one of the door and the doorjamb said baseplate is positioned approximately parallel to a working surface of the one of the door and the doorjamb.

5. In a clamp and guide apparatus according to claim 1 wherein said mount means comprise said clamp bracket having a cutout hole, said support arm positional within said cutout hole.

6. In a clamp and guide apparatus according to claim 5 wherein said clamp bracket has an alignment hole and said contact member has an alignment pin, and said adjustment means engages said alignment pin within said alignment hole.

7. In a clamp and guide apparatus according to claim 5 wherein said lock means comprise said support arm having at least one position hole, a lock tang extending from said clamp bracket, and said lock tang being mateable within said position hole.

8. In a clamp and guide apparatus according to claim 5 further comprising bias means for urging said clamp bracket towards said contact member.

9. In a clamp and guide apparatus according to claim 8 wherein said bias means comprise a leaf spring having one end secured with respect to said clamp bracket, and in a mounted position of the clamp and guide apparatus on the one of the door and the doorjamb an opposite end of said leaf spring urged against said support arm.

10. In a clamp and guide apparatus according to claim 1 wherein said adjustment means comprise a clamping screw, said clamping screw rotatably mounted with respect to said support arm, and said contact member mounted at a free end of said clamping screw.

11. In a clamp and guide apparatus according to claim 10 wherein said support arm has an internally threaded arm through hole and said clamping screw is engaged within said arm through hole.

12. In a clamp and guide apparatus according to claim 1 further comprising locator means for positioning said baseplate with respect to the one of the door and the doorjamb, said locator means positionable within an opening of the template.

13. In a clamp and guide apparatus according to claim 12 wherein said locator means comprise a locator bracket, set means for setting a position of said locator bracket with respect to the template, and said locator bracket having sight means for moving the clamp and guide apparatus to align said locator bracket into a reference position.

14. In a clamp and guide apparatus according to claim 1 wherein said mount means comprise said clamp bracket having a base portion adjacent said grasping leg portion, and said grasping leg portion angled with respect to said base portion.

15. In a clamp and guide apparatus according to claim 14 wherein in a fixed position of said clamp bracket with respect to said support arm said lock means force said clamp bracket against said support arm establishing frictional contact between said grasping leg portion and said support arm and between said base portion and said support arm.

16. In a clamp and guide apparatus according to claim 1 wherein said mount means force said clamp bracket against said support arm.

17. In a clamp and guide apparatus according to claim 16 wherein said mount means comprise said support arm having an arm through hole, said clamp bracket having a bracket through hole, and a clamping screw extending through said arm through hole and said bracket through hole.

18. In a clamp and guide apparatus according to claim 1 wherein said contact member comprises a shoe positioned adjacent an inner side of said support arm, said inner side opposite an outer side of said support arm, and said outer side contacting said clamp bracket.

19. In a clamp and guide apparatus according to claim 18 further comprising bias means for urging said shoe against said inner side of said support arm.

20. In a clamp and guide apparatus according to claim 19 wherein said bias means comprise said shoe having a shoe through hole, a rod extending through said shoe through hole, a spring mounted about said rod, and said spring having one end biased against said shoe.

21. In a clamp and guide apparatus according to claim 18 wherein said shoe pivots with respect to said support arm.

* * * * *